US008162516B2

(12) United States Patent
Zheng

(10) Patent No.: US 8,162,516 B2
(45) Date of Patent: Apr. 24, 2012

(54) LED READING LAMP

(75) Inventor: Shi-Song Zheng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/477,114

(22) Filed: Jun. 2, 2009

(65) Prior Publication Data

US 2010/0165644 A1 Jul. 1, 2010

(30) Foreign Application Priority Data

Dec. 26, 2008 (CN) .......................... 2008 1 0306566

(51) Int. Cl.
*B60Q 1/06* (2006.01)
*F21V 29/00* (2006.01)

(52) U.S. Cl. ........ 362/373; 362/410; 362/411; 362/412; 362/413; 362/414; 362/415

(58) Field of Classification Search .................. 362/373, 362/410–415
See application file for complete search history.

(56) References Cited

U.S. PATENT DOCUMENTS

| | | | | |
|---|---|---|---|---|
| 4,654,762 | A * | 3/1987 | Laverick | 362/97.1 |
| 7,845,824 | B2 * | 12/2010 | Robotham | 362/231 |
| 2008/0062687 | A1 * | 3/2008 | Behar et al. | 362/240 |
| 2009/0180284 | A1 * | 7/2009 | Lin et al. | 362/294 |

FOREIGN PATENT DOCUMENTS

| | | | |
|---|---|---|---|
| CN | 101109498 | A | 1/2008 |
| CN | 201041338 | Y | 3/2008 |
| CN | 201057395 | Y | 5/2008 |

* cited by examiner

*Primary Examiner* — William Carter
(74) *Attorney, Agent, or Firm* — Altis Law Group, Inc.

(57) ABSTRACT

An LED reading lamp includes a base, a supporting bracket fixed on the base, a heat sink mounted on the supporting bracket and an LED module mounted on a bottom surface of the heat sink. The supporting bracket has a vertical part vertically fixed on the base and a horizontal part extending horizontally from an upper end of the vertical part. The horizontal part defines an opening therein. The heat sink is placed on a top surface of the supporting bracket and located over the opening. The LED module is received in the opening of the horizontal part.

19 Claims, 3 Drawing Sheets

LED READING LAMP

BACKGROUND

1. Technical Field

The present disclosure relates to a reading lamp and, more particularly, to a LED (light emitting diode) reading lamp which utilizes an LED module as a light source.

2. Description of Related Art

Conventional reading lamp is often in a form of small, convenient and mobile "puck" lights. These puck lights are so called because they are often round and can be mounted and moved with a minimum of effort. These lights generally utilize fluorescent or incandescent lamps as a light source. Fluorescent and incandescent lamps typically required filaments and cathode tubes for operation. As such, they are fragile and have relatively short operating life. Furthermore, filament lamps are not the most economical to operate. In addition, by producing light by heating a filament, incandescent lamps generate a great deal of heat. This heat building up limits the effectiveness of traditional night light due to safety considerations and the possibility of unintentionally and adversely heating items on countertops. This heat generation also makes traditional puck light less versatile in that of some places in which such a light would be desired cannot accommodate a large buildup of heat (e.g. closets, shelves, etc.).

Moreover, traditional incandescent and fluorescent lights are quite inefficient. An incandescent and fluorescent light converts a large amount of energy to heat rather than light, and fluorescent lamps have a relative high start up power consumption. Accordingly, new ways to provide more efficient lighting use are desired in reading lamp.

What is needed, therefore, is an LED reading lamp which can overcome the above-mentioned disadvantages.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
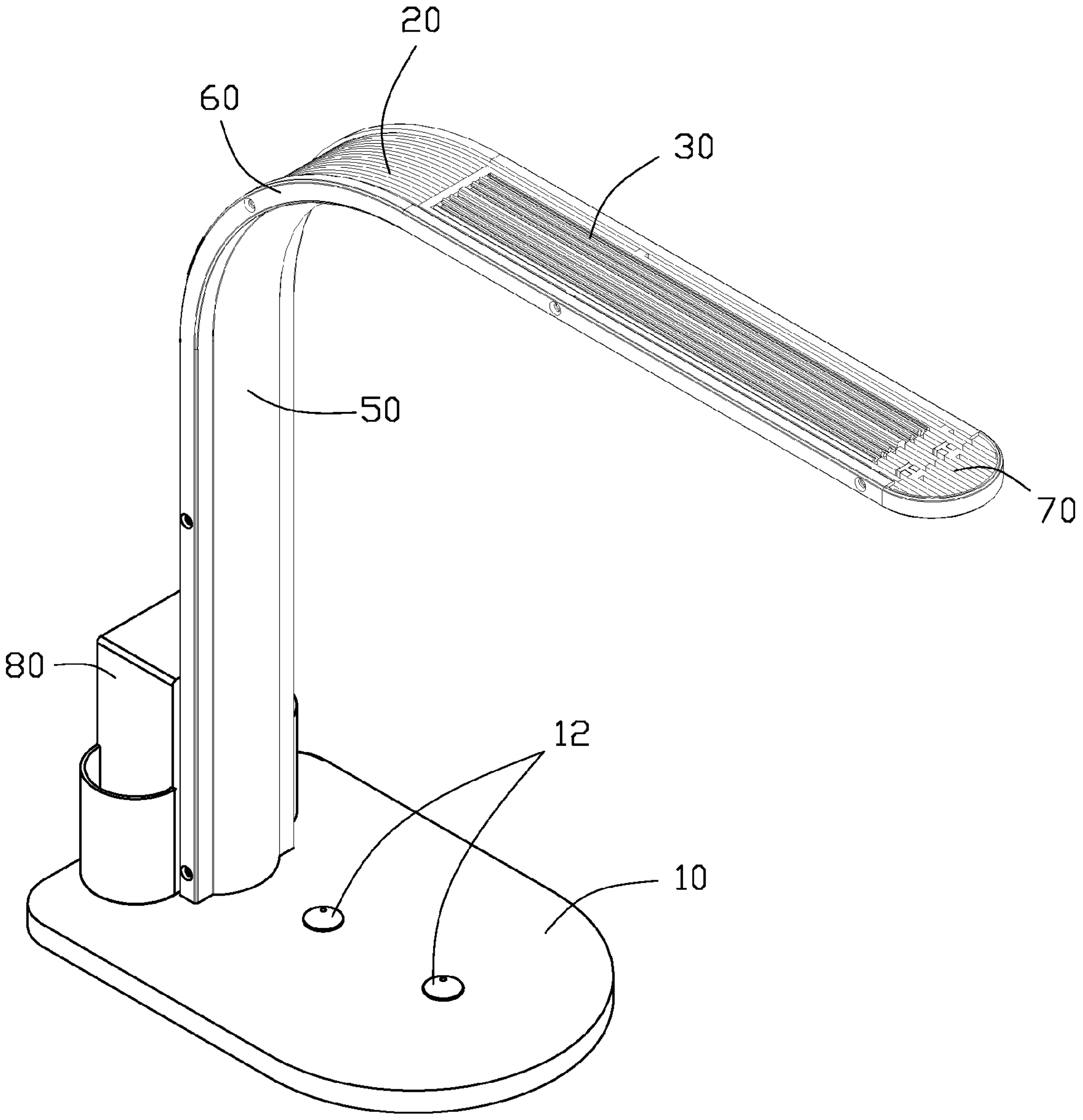
FIG. 1 is an assembled, isometric view of an LED reading lamp in accordance with an embodiment of the present disclosure.
Figure 2:
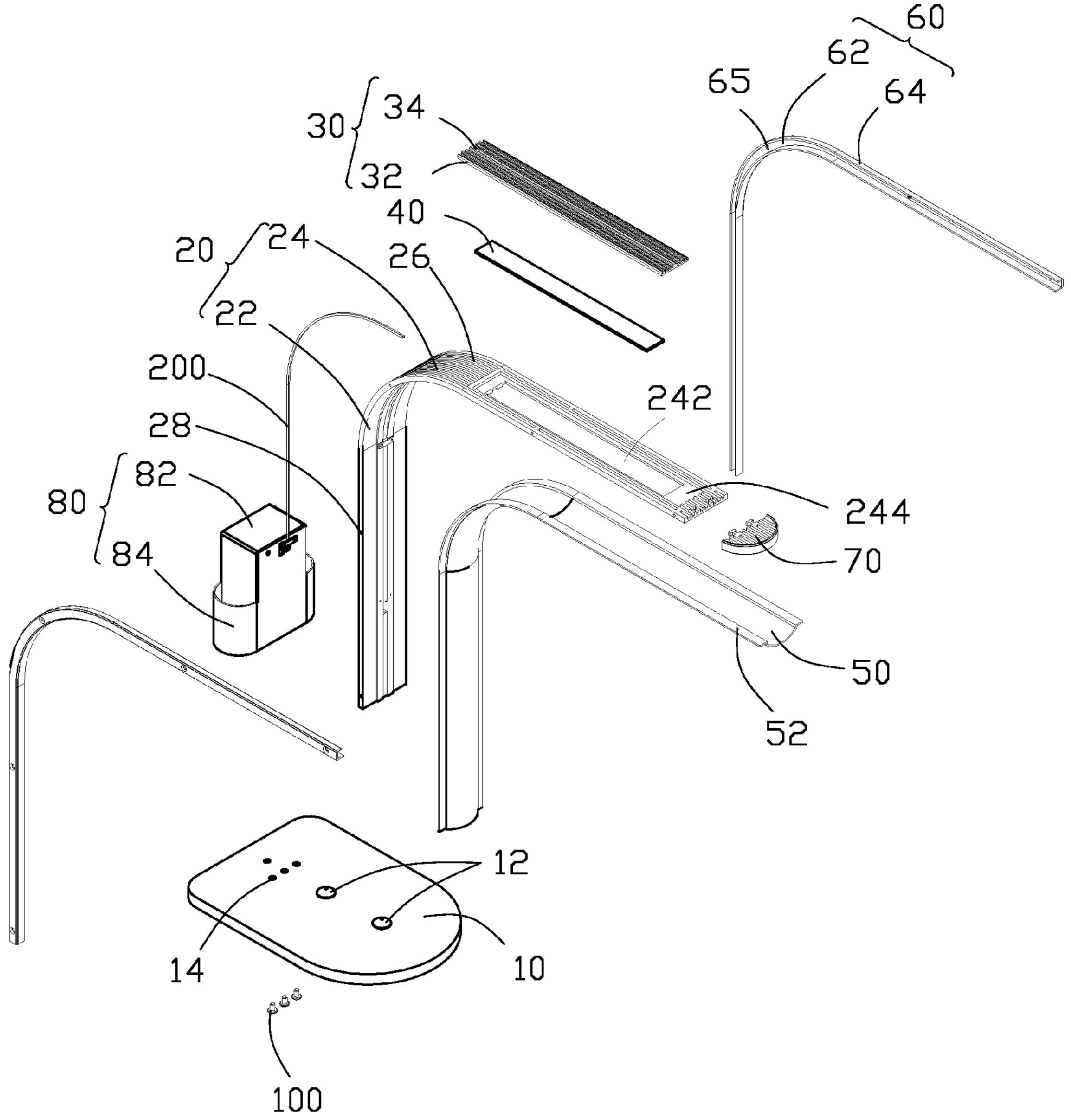
FIG. 2 is an exploded view of the LED reading lamp of FIG. 1.
Figure 3:
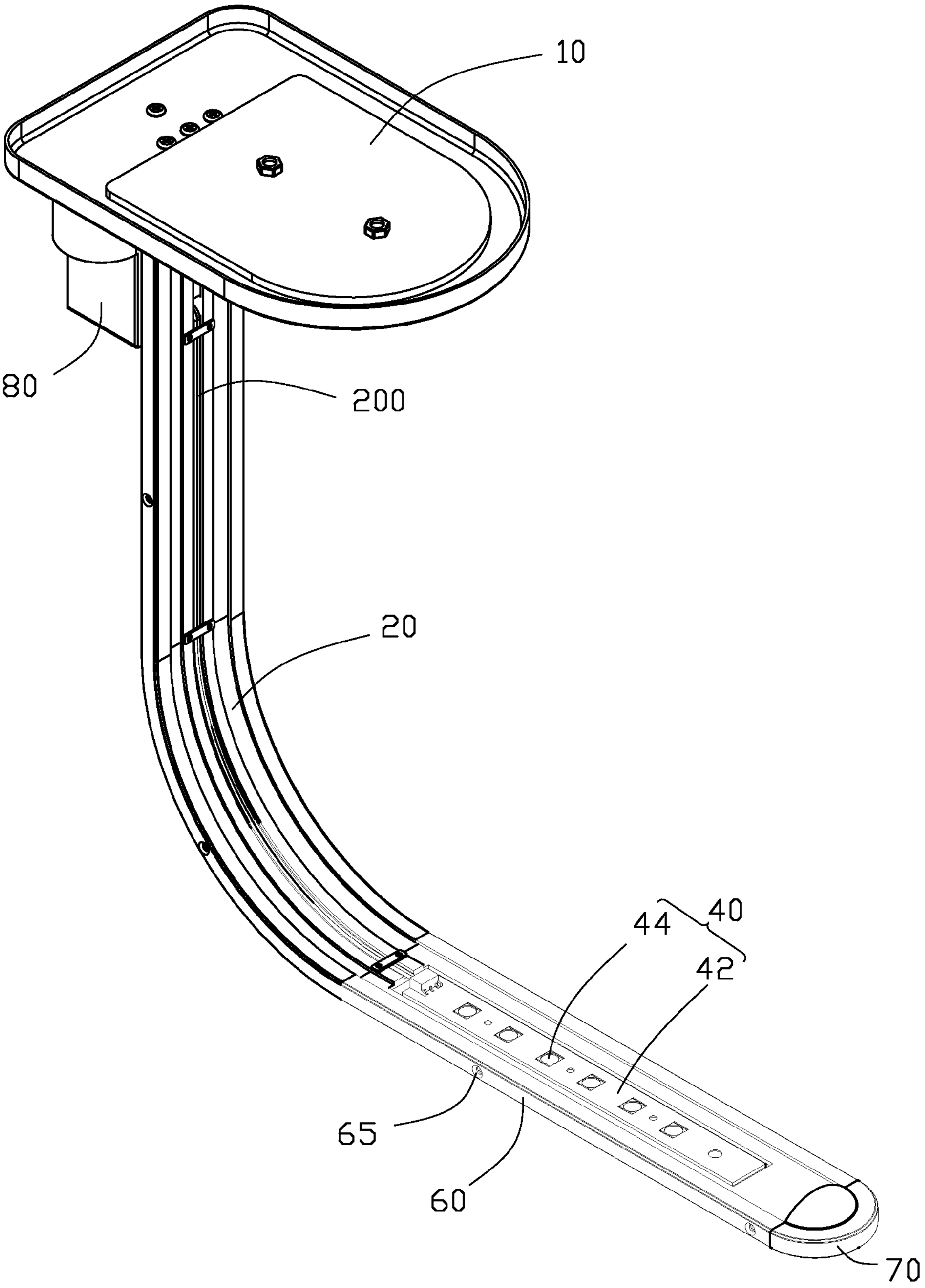
FIG. 3 is an inverted view of the LED reading lamp of FIG. 1, with a cover taken away.

Referring to FIGS. 1-3, an LED reading lamp adapted for being placed on a desk to provide comfortable light for reading is illustrated. The LED reading lamp comprises a base 10, a supporting bracket 20 fixed on a top of the base 10, a heat sink 30 mounted on the supporting bracket 20, an LED module 40 attached to a bottom surface of the heat sink 30, a lamp cover 50 mounted to an inner face of the supporting bracket 20, two clipping members 60 clipping the lamp cover 50 and the supporting bracket 20 together, and an end cap 70 mounted to an upper free end of the supporting bracket 20.

The base 10 is provided with two switches 12 thereon to turn on/off the LED reading lamp and defines a plurality of mounting holes 14 therein for allowing screws 100 extending upwardly therethrough to engage with the supporting bracket 20.

The supporting bracket 20 is formed by bending an elongated plastic or metallic plate and substantially L-shaped. The supporting bracket 20 comprises a vertical part 22 vertically standing on the base 10 and a horizontal part 24 bent from an upper end of the vertical part 22 and parallel to the base 10. A round corner is formed at a joint of the vertical part 22 and the horizontal part 24. A plurality of spaced protruding strips 26 are arranged on an outer surface of the supporting bracket 20 along a lengthwise direction of the supporting bracket 20 and parallel to two opposite lateral sides of the supporting bracket 20. The horizontal part 24 defines an elongated opening 242 in a central portion along the lengthwise direction thereof. A rectangular, annular and flat supporting part 244 is formed on a top surface of the horizontal part 24 and surrounds the opening 242. A plurality of fixing holes 28 are defined in the two opposite lateral sides of the supporting bracket 20 for engagingly receiving screws (not shown) extending through the clipping members 60 to couple the two clipping members 60 to the lateral sides of the supporting bracket 20.

The heat sink 30 comprises a base plate 32 and a plurality of spaced fins 34 extending upwardly from a top surface of the base plate 32. The base plate 32 is constructed to perfectly match the supporting part 244 of the supporting bracket 20. When the base plate 32 of the heat sink 30 is placed on the supporting part 244 of the supporting bracket 20, the fins 34 parallel to each other are arranged in a direction consistent to that of the protruding strips 26 of the supporting bracket 20 and have top ends coplanar with top ends of the protruding strips 26 of the horizontal part 24 of the bracket 20. A central part of a bottom surface of the base plate 32 is corresponding to the opening 242 of the horizontal part 24 and exposed to the opening 242.

The LED module 40 is accommodated in the opening 242 of the supporting bracket 20 and attached to the central part of the bottom surface of the base plate 32 of the heat sink 30. The LED module 40 comprises an elongated printed circuit board 42 having one side engaging with the central part of the bottom surface of the base plate 32 and a plurality of LED components 44 mounted on another side of the printed circuit board 42 and facing downwards.

The lamp cover 50 is made of semi-transparent or transparent material and bent into an L-shape to match and cover the inner face of the supporting bracket 20. The lamp cover 50 has two flatted engaging flanges 52 formed at two lateral portions thereof. The two engaging flanges 52 are intimately attached to two corresponding lateral portions of the inner face of the supporting bracket 20. A middle portion of the lamp cover 50 connected to two facing inner edges of the two engaging flanges 52 plumps up to form a covering space between the lamp cover 50 and the supporting bracket 20.

The clipping members 60 are fixed to opposite lateral sides of the supporting bracket 20 and the lamp cover 50. Each clipping member 60 comprises a connecting strip 62 and two clipping flanges 64 extending perpendicularly from two opposite long edges of the connecting strip 62. The connecting strip 62 is L-shaped and fitly attached to the lateral sides of the supporting bracket 20 and the lamp cover 50 at a same side. The connecting strip 62 defines a plurality of through holes 65 therein for the screws extending therethrough and being screwed into the corresponding fixing holes 28 in the lateral side of the supporting bracket 20 to fix the clipping member 60 at the lateral sides of the supporting bracket 20 and the lamp cover 50. The clipping flanges 62 of each clipping member 60 sandwich the corresponding lateral portions of the supporting bracket 20 and the engaging flange 52 of the lamp cover 50 therebetween to securely clip the supporting bracket 20 and the lamp cover 50 together.

The end cap 70 is connected to the free ends of the supporting bracket 20 and the lamp cover 50 and has a plurality of protruding strips (not labeled) formed on a top surface thereof and joining the protruding strips 26 of the supporting bracket 20.

The LED reading lamp further includes an accessional member 80 placed on the base 10 and located at an outer side of the vertical part 22 of the supporting bracket 20. The accessional member 80 comprises a receiving box 82 for receiving related electronic components such as driving and controlling circuit boards, etc. and two semi-cylindrical pencil vases 84 formed at two opposite lateral sides of the receiving box 82. A lead wire 200 extends along the inner face of the supporting bracket 20 to electrically connect the related electronic components in the receiving box 82 and the LED module 40.

In use, light generated by the LED module 40 passes through the lamp cover 50 to provide readers with comfortable illumination for reading. Heat generated by the LED module 40 is directly adsorbed by the base plate 32 of the heat sink 30 and then distributed over the fins 34 of the heat sink 30 to dissipate into ambient environment. As the supporting bracket 20 can be made of metallic material and also can be in thermal conducting relationship with the base plate 32 of the heat sink 30, the heat accumulated in the base plate 32 also can be simultaneously conducted to the protruding strips 26 formed on the outer face of the supporting bracket 20 to dissipate into ambient environment. In addition, the lifespan of the LED components 44 of the LED module 40 has at least 100,000 working hours; therefore, the LED reading lamp can provide a relatively longer usage than the conventional reading lamp using bulb or fluorescent light.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED reading lamp comprising:

a base;

a supporting bracket fixed on the base and defining an opening therein, the supporting bracket comprising a vertical part standing on the base, and a horizontal part bending from the vertical part, the opening extending through the horizontal part from an inner face to an outer face of the horizontal part;

a heat sink mounted on the supporting bracket and located over the opening; and an LED module accommodated in the opening and attached to a bottom of the heat sink;

wherein a plurality of protruding strips is formed on the outer face of the horizontal part and around the LED module and the heat sink, the heat sink being in thermal conducting relationship with the protruding strips;

wherein a smooth corner is formed between and interconnecting the vertical part and the horizontal part of the supporting bracket; and wherein the LED reading lamp further comprises a lamp cover which is made of transparent or semi-transparent material, the lamp cover covers inner surfaces of the horizontal part, the smooth corner and the vertical part of the supporting bracket.

2. The LED reading lamp of claim 1, wherein the heat sink is placed on the outer face of the horizontal part of the supporting bracket.

3. The LED reading lamp of claim 2, wherein a flatted supporting part surrounding the opening is formed on the outer face of the supporting bracket and engages with an edge portion of the bottom of the heat sink to secure the heat sink thereon.

4. The LED reading lamp of claim 3, wherein the heat sink comprises a base plate having a bottom surface engaging with the supporting part of the supporting bracket and a plurality of fins formed on a top surface of the heat sink.

5. The LED reading lamp of claim 4, wherein the opening and the base plate are elongated and arranged along a lengthwise direction of the supporting bracket, the base plate is located over the opening with a central part of the bottom surface corresponding to the opening.

6. The LED reading lamp of claim 4, wherein the protruding strips on the outer face of the supporting bracket and the fins of the heat sink are parallel to two opposite lateral sides of the supporting bracket and arranged along a lengthwise direction of the supporting bracket.

7. The LED reading lamp of claim 1, wherein the supporting bracket is bent into an L-shape.

8. The LED reading lamp of claim 1, wherein two flatted engaging flanges are formed at two lateral portions of lamp cover and are engaged with two corresponding lateral portions of the inner face of the supporting bracket, while a middle portion of the lamp cover connecting two facing inner edges of the two engaging flanges plumps up to from a covering space between the lamp cover and the supporting bracket.

9. The LED reading lamp of claim 8, further comprising two clipping members attached to opposite lateral sides of the lamp cover and the horizontal part, the smooth corner and the vertical part of the supporting bracket to fasten the lamp cover and the supporting bracket together.

10. The LED reading lamp of claim 9, wherein each clipping member comprises a connecting strip attached to corresponding lateral sides of the supporting bracket and the lamp cover at a same side and two clipping flanges sandwiching therebetween lateral portions of the supporting bracket and the engaging flange of the lamp cover near the corresponding lateral sides.

11. The LED reading lamp of claim 1, further comprising an accessional member placed on the base and located at an outer side of the supporting bracket, the accessional member comprising a receiving box for receiving electronic components therein and two semi-cylindrical pencil vases formed at two opposite lateral sides of the receiving box.

12. The LED reading lamp of claim 1, wherein the protruding strips are further formed on an outer surface of the smooth corner.

13. An LED reading lamp comprising:

a base;

a supporting bracket comprising a vertical part vertically fixed on the base and a horizontal part extending horizontally from an upper end of the vertical part, the horizontal part defining an opening therein; and a heat sink placed on a top surface of the supporting bracket and located over the opening;

an LED module mounted on a bottom surface of the heat sink and received in the opening of the horizontal part; and a lamp cover made of transparent or semi-transparent material, the lamp cover covering inner faces of the horizontal part and the vertical part of the supporting bracket, the LED module being sealed among the supporting bracket, the lamp cover and the heat sink.

14. The LED reading lamp of claim 13, wherein the heat sink comprises a base plate to which the LED module is attached and a plurality of fins formed on a top surface of the base plate, the base plate being in thermal conducting relationship with a plurality of protruding strips formed on the outer face of the supporting bracket.

15. The LED reading lamp of claim 14, wherein a flatted supporting part surrounding the opening is formed on the outer face of the supporting bracket and engages with an edge portion of a bottom surface of the base plate to secure the heat sink thereon.

16. The LED reading lamp of claim 13, wherein two flatted engaging flanges are formed at two lateral portions of the lamp cover and are engaged with two lateral portions of the inner face of the supporting bracket, while a middle portion of the lamp cover connecting two facing inner edges of the two engaging flanges plumps up to form a covering space between the lamp cover and the supporting bracket.

17. The LED reading lamp of claim 13, further comprising two clipping members attached to opposite lateral sides of the lamp cover, each clipping member having two spaced clipping flanges sandwiching corresponding lateral portions of the horizontal part and the vertical part of the supporting bracket and the lamp cover therebetween to secure the lamp cover and the supporting bracket together.

18. The LED reading lamp of claim 13, wherein the supporting bracket further comprises a smooth corner formed between and interconnecting the vertical part and the horizontal part of the supporting bracket, and a plurality of protruding strips formed on outer faces of the horizontal part and the smooth corner, the heat sink being in thermal conducting relationship with the protruding strips.

19. An LED reading lamp comprising:

a base;

a supporting bracket fixed on the base and defining an opening therein, the supporting bracket comprising a vertical part standing on the base, and a horizontal part bending from the vertical part, the opening extending through the horizontal part from an inner face to an outer face of the horizontal part;

a heat sink mounted on the supporting bracket and located over the opening; and an LED module accommodated in the opening and attached to a bottom of the heat sink;

wherein a plurality of protruding strips is formed on the outer face of the horizontal part and around the LED module and the heat sink, the heat sink being in thermal conducting relationship with the protruding strips;

wherein a smooth corner is formed between and interconnecting the vertical part and the horizontal part of the supporting bracket; and wherein the protruding strips are further formed on an outer surface of the smooth corner.

* * * * *